Dec. 2, 1969 — R. H. BERG — 3,481,202
METERING SIPHON CONSTRUCTION
Filed Sept. 27, 1967
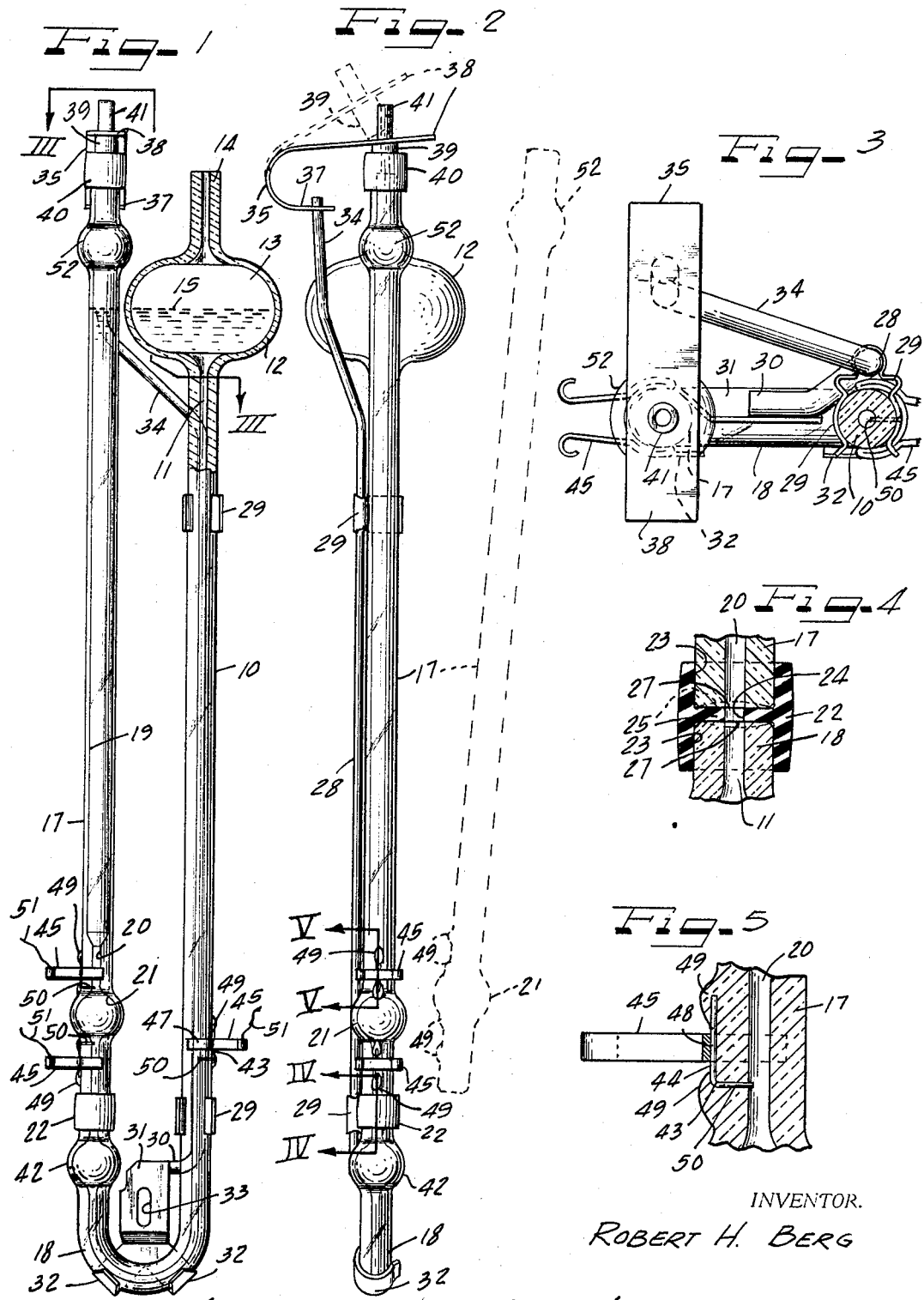
INVENTOR.
ROBERT H. BERG
ATTORNEYS

United States Patent Office 3,481,202
Patented Dec. 2, 1969

---

3,481,202
METERING SIPHON CONSTRUCTION
Robert H. Berg, 196 Clinton Ave.,
Elmhurst, Ill. 60126
Filed Sept. 27, 1967, Ser. No. 670,835
Int. Cl. G01k 1/08
U.S. Cl. 73—432          10 Claims

ABSTRACT OF THE DISCLOSURE

A metal bracket supports a tubular mercury column section having an upper mercury reservoir and a lower gooseneck to which is removably attached a metering tube section, the upper end of which is releasably engaged by a clip on the bracket.

---

This invention relates to a new metering siphon construction and is more particularly concerned with a novel bracket and separable sectional tube arrangement in such a construction, as well as other features.

In an apparatus of this character, it has heretofore been necessary to have separate devices or more than two metering contacts in the metering region for different volume capacities. Cleaning of prior devices has also presented a problem. More particularly, cleaning of the metering section has presented an especial problem in prior devices. Further, when any part of the glass tubing is broken in prior devices the entire device is rendered useless.

An important object of the present invention is to provide a novel metering siphon construction which will overcome the foregoing and other problems and deficiencies of prior constructions and which will afford a readily separable and replaceable metering section for the device.

Another object of the invention is to provide a novel supporting structure for metering siphons.

A further object of the invention is to provide a novel electrical probe and separable contact clip structures for a metering siphon.

Other objects, features and advantages of the present invention will be readily apparent from the following detailed description of a preferred embodiment thereof taken in conjunction with the accompanying drawings in which:

FIGURE 1 is a side elevational view of a metering siphon construction embodying features of the invention, with a portion thereof in vertical section;

FIGURE 2 is a side elevational view of the metering siphon construction;

FIGURE 3 is a top plan sectional detail view taken substantially along the line III—III of FIGURE 1;

FIGURE 4 is an enlarged fragmentary sectional detail view taken substantially along the line IV—IV of FIGURE 2; and FIGURE 5 is a fragmentary enlarged vertical sectional detail view taken substantially along the line V—V of FIGURE 2.

In a preferred construction, the metering siphon of the present invention comprises a generally U-shaped structure preferably of a dielectric material such as glass, having a vertical mercury column section 10. This has a small diameter passage 11 extending throughout its length, with a bulbous enlargement 12 adjacent to the upper end of the column defining a reservoir 13, with the upper extremity of the tube, above the reservoir providing a nipple 14. Through this nipple connection is effected with apparatus of a repeating dispenser or other apparatus in which metered quantities of fluid are utilized or in which it is desired to control certain operations correlated with a metered volume of fluid flowing into or out of or through a particular cycle, section or area, as the case may be.

Vacuum applied through the nipple 14 causes mercury 15 to rise within the column in the passage 11 into the reservoir 13.

According to the present invention, a tubular metering section 17 is provided which, instead of being constructed as a one-piece extension of the mercury column section 10, is constructed as a separate, complementary tube of a length to extend at its upper end to substantially the same height as the top of the nipple portion 14 of the section 10. At its lower end the section 17 is connected to the upper end of a gooseneck yoke 18 comprising, in this instance, the lower end portion of the section 10 and rising to a limited distance with its connection extremity on an axis preferably parallel to the axis of the section 10. Extending throughout the length of the metering tube 17 is a passage 19 the lower portion of which is of a restricted diameter providing a metering section 20 having intermediate its length a small volume bulbous mercury reservoir enlargement 21.

Novel means for connecting the metering tube 17 with the terminal of the gooseneck 18 comprise an elastomeric slip-on connector 22 of generally H-shaped longitudinal cross section provided with respective oppositely opening coaxially aligned sockets 23 within which the confronting ends of the glass tubes are snugly frictionally received with their passages 11 and 20 aligned and freely connected through a coaxial passage 24 in a separating partition 25 of the connector. This partition serves to prevent direct contact of the glass terminals so that rocking of the metering tube 17 relative to the gooseneck terminal during assembly or removal of the metering tube will not cause the contact fracturing of the terminals. Further, the partition 25 cooperates with the tubular walls defining the sockets 23 to effect tight seal against leakage by squeezing engagement thereof by and between the tube ends. These features are enhanced by a generally lenticular form of the partition 25 such that its opposite faces are convex as shown in dash line in FIG. 4, while the confronting tube ends are substantially straight across at their surfaces 27.

A support for the joined mercury tube 10 and metering tube 17 is provided by a common bracket structure desirably comprising an elongated rod body of a length to extend in parallel relation along the major extent of the mercury column tube 10 and with a longitudinally spaced pair of identical spring clips 29 affixed on the bracket body firmly but releasably engaging the tube 10 adjacent to respectively the reservoir bulb 12 and the gooseneck 18. On its lower end portion the bracket body has a relatively short lateral leg 30 to which is fixedly secured a bracket plate 31 having a pair of divergently related hook-like supporting fingers 32 engaging under the gooseneck 18. Desirably the plate 31 has an opening 33 therein receptive of an attaching screw or the like by which the bracket is adapted to be fastened to the apparatus with which the device as an assembly is to be used.

On its upper end the supporting bracket has means for releasably securing the metering tube 17. For this purpose, the upper end portion of the bracket body 28 comprises an arm 34 which is angled laterally relative to the mercury column tube 10 to a position adjacent to but spaced from the upper portion of the metering tube and carries fixedly thereon a generally sidewardly U-shaped spring retaining clip 35. This clip has a relatively short leg 37 secured to the arm 34 and a relatively longer spring arm 38 extending into overlying relation to the upper end of the metering tube 17. Mounted on the spring leg 38 is a tubular connecting lug 39 which is engageable in a socketed connector 40 desirably of the same construction as, and for standardization purposes identical with, the connector 22 fitted onto the upper end of the metering tube. A tubular vent extension 41 from the tubular connector lug 39 is desirably provided above the arm 38 and may also serve as a connecting nipple for a control duct or the like, if desired. For example it may be desired to effect movement of the mercury column in the metering tube 17 and the mercury column tube 10 by pressure exerted through the nipple 41 rather than or supplemental to vacuum applied through the nipple 14. Through this arrangement, separation or attachment of the lug 39 with respect to the connector 40 is readily effected by springing the clip arm 38 as a lever into or out of the connecting relation, as indicated in full and dash outline in FIGURE 2. Pressure of the retaining clip spring arm 38 against the top of the section 17 results in coaction with the yoke-supporting fingers 32 to impart a compressive thrust to effect the squeezing of the portion 25. Mounting or replacement of the metering tube 17 relative to the mercury column tube 10 and the bracket is easily effected without dismantling the device with respect to associated apparatus. For example, if it should be desired to clean the tube 17 or replace the same with a different tube, the mercury column 15 will be entirely withdrawn into the tube 10 and its reservoir 13 as well as a small volume supplemental bulb reservoir 42 adjacent to the terminal of the gooseneck 18, and the tube 17 can then be readily removed from the assembly, cleaned and replaced, or a different tube inserted in its place, as preferred.

Various electrical operating connections are effected in respect to the tubes 10 and 17, and more particularly with the mercury column in the tubes. Desirable means for this purpose comprise respective thin wire platinum contacts 43. These are generaly L-shape with one leg 44 partially embedded in a perimeter of the associated glass tube, preferably extending longitudinally along such perimeter and adequately exposed so that a snap-on contact clip 45 will by the pulling tension of opposed complementary tube-gripping resilient legs 47 draw a contact yoke 48 of the clip firmly against the contact leg 44. Firm anchorage of the contact leg 44 in the glass wall is assured by bosses or lugs 49 of glass comprising either humps of the glass wall itself pulled out for this purpose or small lumps of compatible glass fused onto the wall according to glass blowers' preferred techniques. These bosses 49 also serve to retain the respective spring clip contacts 43 against longitudinal displacement from the respective contacts 44.

A second, probe leg 50 of each of the contacts 43 extends integrally from one end of the leg 44 radially inwardly through the tube wall and has its terminal portion extending into the passage within the associated tube so as to make effective contact with the mercury in the passage at the selected point for that contact. In the present instance, one of the contacts 43 is located in and on the wall of the mercury column tube 10 adjacently spaced above the gooseneck yoke 18. Two of the contacts 43 are carried by the metering tube 17 at respectively opposite ends of the small mercury reservoir 21. Through this arrangement the contact 43 on the tube 10 maintains continuous contact with the mercury, and the contacts 43 on the metering tube 17 are in contact with the mercury while it is in that tube. As the mercury is displaced from the metering tube 17 in operation of the associated apparatus, its contacts will be successively free from top to bottom, or will be successively or progressively contacted by the mercury moving up in the metering tube, to afford desired electrical signal information in an operating, control or recording system with which the respective clips on contacts 45 are connected by suitable conductor leads 51.

A useful function of the small reservoir 21 between the contacts 43 at opposite ends thereof is to provide an improved time interval in movement of mercury between such contacts 43, as compared with relatively rapid displacement movement of the mercury column through the small diameter passage portion 20. Provision of the similar bulbous small reservoir enlargement 42 adjacent to the terminal of the gooseneck 18 serves as a safety receptacle for the mercury column in the small diameter passage 11 when all of the mercury is displaced thereinto and thus avoid mercury spillage when the metering tube 17 is detached as for cleaning or replacement. To similar advantage is a small bulbous receptacle enlargement 52 located on the upper end portion of the metering tube 17 adjacent to the upper terminal end wherein upward surge of the mercury column is dissipated during sudden release from its displacement entirely or substantially into the tube 10 and the main mercury reservoir 13.

It will be apparent that many modifications and variations may be effected without departing from the scope of the novel concepts of the present invention.

I claim as my invention:

1. In a metering siphon construction:

a generally U-shaped tubular structure providing a tubular upright mercury column section having a reservoir in the upper portion thereof and a generally upright upwardly extending tubular metering section with a yoke connecting the lower ends of the sections; and a supporting bracket comprising an upright bar having means on its lower end removably supporting said yoke and retaining clip means at intervals thereabove removably attached to said sections.

2. A construction as defined in claim 1, in which one of said sections is separably connected in said structure and is removable with respect to said bracket independently of the other of said sections.

3. A construction as defined in claim 2, in which said separable section has a relatively small cross-sectional passage therethrough, an enlargement on said section defining a reservoir adjacent to its lower end, respective electrical probe contacts extending through the wall of the separable section adjacent to the upper and lower ends of said enlargement, and a second enlargement adjacent to the upper end of said separable section and the opening from said passage and affording an overflow-preventing receptacle.

4. A construction as defined in claim 2, including a tubular elastomeric connector having oppositely opening axially aligned sockets engaged on an end portion of the separable section and on an end portion of the yoke, respectively, and provided with an intervening sealing partition with an axial passage therethrough.

5. A construction as defined in claim 4, in which said partition is normally of generally lenticular form and the ends of the separable section and the yoke are substantially straight across in engagement with the partition, one of said clip means acting on said separable section and with said yoke supporting means imparting compressive thrust to effect squeezing of said partition between said ends to effect a thorough sealing coaction of said ends and said partition.

6. A construction as defined in claim 1, in which one of said sections and said yoke are separable, a connector on and between said one section and an end of the yoke, and the yoke has a reservoir enlargement in its end portion adjacent to said connector.

7. A construction as defined in claim 1, in which said metering section also has a reservoir enlargement on its upper portion and located at least as high as the top of the mercury column reservoir.

8. A construction as defined in claim 1, in which one of said clip means comprises a resilient lever carrying a combination connecting plug and vent, and a connector separably attaching said plug and vent to the upper end of the said metering section.

9. A construction as defined in claim 1, in which at least one of said sections is of dielectric material and has an electrical contact exposed on its outer perimeter with a probe extending therefrom through the wall of said one section and with a terminal portion thereof within a passage defined by said one section, and a spring contact terminal clip engaging said one section and in electrical contact with said terminal.

10. A construction as defined in claim 9, in which said electrical contact comprises a generally L-shaped piece of wire of which the probe comprises one leg and a second leg extends in substantial exposed relation longitudinally along said one section and spaced combination anchoring and terminal clip retaining bosses on the wall of said section embed the respected opposite end portions of said longitudinal legs.

References Cited

UNITED STATES PATENTS 2,869,078  1/1959  Coulter et al. _____ 324—71

DONALD O. WOODIEL, Primary Examiner

U.S. Cl. X.R.

324—71